United States Patent
Hsieh et al.

(10) Patent No.: US 7,440,405 B2
(45) Date of Patent: Oct. 21, 2008

(54) APPARATUS AND METHOD FOR PACKET FORWARDING WITH QUALITY OF SERVICE AND RATE CONTROL

(75) Inventors: Kuen-Rong Hsieh, Hsinchu (TW); Lan-feng Wang, Pingzhen (TW); Chiu-tien Wu, Changhua (TW)

(73) Assignee: RETI Corporation, Neihu (TW)

( * ) Notice: Subject to any disclaimer, the term of this patent is extended or adjusted under 35 U.S.C. 154(b) by 683 days.

(21) Appl. No.: 11/078,168

(22) Filed: Mar. 11, 2005

(65) Prior Publication Data

US 2006/0203721 A1    Sep. 14, 2006

(51) Int. Cl.
*G01R 31/08* (2006.01)
(52) U.S. Cl. .................. 370/235; 370/230; 370/412; 370/474; 370/475; 370/391; 370/392; 370/394
(58) Field of Classification Search .......... 370/229, 370/230, 285, 412, 235, 465, 474, 475, 389, 370/401
See application file for complete search history.

(56) References Cited

U.S. PATENT DOCUMENTS

| | | | |
|---|---|---|---|
| 6,115,378 A | 9/2000 | Hendel et al. | |
| 6,163,539 A * | 12/2000 | Alexander et al. | 370/392 |
| 6,658,003 B1 * | 12/2003 | Sugai et al. | 370/392 |
| 6,876,626 B1 * | 4/2005 | Onoe et al. | 370/229 |
| 7,065,578 B2 * | 6/2006 | Garrett et al. | 709/229 |
| 2004/0143734 A1 * | 7/2004 | Buer et al. | 713/153 |
| 2004/0151197 A1 * | 8/2004 | Hui | 370/412 |
| 2005/0010668 A1 * | 1/2005 | Chen | 709/227 |
| 2005/0220093 A1 * | 10/2005 | Chen et al. | 370/389 |

* cited by examiner

*Primary Examiner*—Ricky Ngo
*Assistant Examiner*—Kibrom T Hailu
(74) *Attorney, Agent, or Firm*—Wang Law Firm, Inc.; Li K. Wang

(57) ABSTRACT

A system and method for forwarding data packets with quality of service and rate control. A plurality of data packets are received from a plurality of sources. The header information of each data packet is extracted and compared against a plurality of tables, and then new header information is assembled based upon the comparison results. The data packets have their headers replaced by the new header information on the fly before being sent to their destinations, or the new header information may be dropped if certain conditions are met.

9 Claims, 11 Drawing Sheets

Where Ether Type = 0x0800 (hex) if layer 3 is IPv4
= 0x86dd (hex) if layer 3 is IPv6

APPARATUS AND METHOD FOR PACKET FORWARDING WITH QUALITY OF SERVICE AND RATE CONTROL

BACKGROUND OF THE INVENTION

1. Field of the Invention

The present invention generally relates to data communications, and more specifically, relates to an apparatus and method for handling data packets.

2. Description of the Related Art

A local area network (LAN) is the most basic and simplest network that allows communication between a source computer and destination computer. The LAN is often diagramed as a cloud to which computers (also called end stations or end-nodes) that wish to communicate with one another are attached. At least one network element will connect with all of the end stations in the LAN. A single LAN, however, may be insufficient to meet the requirements of an organization that has many end stations because of the limited number of physical connections available to, and the limited message handling capability of, a single repeater.

The capability of computer networks, however, has been extended by connecting different sub-networks to form larger networks that contain thousands of end-stations communicating with each other. These LANs can in turn be connected to each other to create even larger enterprise networks, including wide area network (WAN) links.

To facilitate communication between subnets in a larger network, more complex electronic hardware and software have been proposed and are currently used in conventional networks. Also, new sets of rules for reliable and orderly communication among those end-stations have been defined by various standards based on the principle that the end-stations interconnected by suitable network elements define a network hierarchy, where end-stations within the same subnet have a common classification. A network is thus said to have a topology which defines the features and hierarchical position of nodes and end stations within the network.

The interconnection of end stations through packet switched networks has traditionally followed a peer-to-peer layered architectural abstract. In such a model, a given layer in a source computer communicates with the same layer of a pier end station (usually the destination) across the network. By attaching a header to the data unit received from a higher layer, a layer provides services to enable the operation of the layer above it. A received packet will typically have several headers that were added to the original payload by the different layers operating at the source.

There are several layer partition schemes in the prior art, such as the Arpanet and the Open Systems Interconnect (OSI) models. The seven layer OSI model used here to describe the invention is a convenient model for mapping the functionality and detailed implementations of other models. Aspects of the Arpanet, however, (now redefined by the Internet Engineering Task Force or IETF) will also be used in specific implementations of the invention to be discussed below.

The relevant layers for background purposes here are Layer 1 (physical), Layer-2 (data link), and Layer-3 (network), and to a limited extent Layer-4 (transport). A brief summary of the functions associated with these layers follows.

The physical layer transmits unstructured bits of information across a communication link. The physical layer concerns itself with such issues as the size and shape of connectors, conversion of bits to electrical signals, and bit-level synchronization. Layer-2 provides for transmission of frames of data and error detection. More importantly, the data link layer as referred to in this invention is typically designed to "bridge," or carry a packet of information across a single hop, i.e., a hop being the journey taken by a packet in going from one node to another. By spending only minimal time processing a received packet before sending the packet to its next destination, the data link layer can forward a packet much faster than the layers above it, which are discussed next. The data link layer provides addressing that may be used to identify a source and a destination between any computers interconnected at or below the data link layer. Examples of Layer-2 bridging protocols include those defined in IEEE 802, such as CSMA/CD, token bus, and token ring (including Fiber Distributed Data Interface, or FDDI).

Similar to Layer-2, Layer-3 also includes the ability to provide addresses of computers that communicate with each other. The network layer, however, also works with topological information about the network hierarchy. The network layer may also be configured to "route" a packet from the source to a destination using the shortest path.

Finally, Layer-4, the transport layer, provides an application program such as an electronic mail program with a "port address" which the application can use to interface with Layer-3. A key difference between the transport layer and the lower layers is that a program on the source computer carries a conversation with a similar program on the destination computer, whereas in the lower layers, the protocols are between each computer and its immediate neighbors in the network, where the ultimate source and destination end-stations may be separated by a number of intermediate nodes. The transport layer can control congestion by simply dropping selected packets, which the source might recognize as a request to reduce the packet rate. Examples of Layer-4 and Layer-3 protocols include the Internet suite of protocols such as TCP (Transmission Control Protocol) and IP (Internet Protocol).

End-stations are the ultimate source and destination of a packet, whereas a node refers to an intermediate point between the end-stations. A node will typically include a network element which has the capability to receive and forward messages on a packet-by-packet basis.

Generally speaking, the larger and more complex networks typically rely on nodes that have higher layer (Layers 3 and 4) functionalities. A very large network consisting of several smaller sub-networks must typically use a Layer-3 network element known as a router which has knowledge of the topology of the sub-networks.

A router can form and store a topological map of the network around it based upon exchanging information with its neighbors. If a LAN is designed with Layer-3 addressing capability, then routers can be used to forward packets between LANs by taking advantage of the hierarchical routing information available from the end-stations. Once a table of end-station addresses and routes has been compiled by the router, packets received by the router can be forwarded after comparing the packet's Layer-3 destination address to an existing and matching entry in the memory.

In comparison to routers, bridges are network elements operating in the data link layer (Layer-2) rather than Layer-3. They have the ability to forward a packet based only on the Layer-2 address of the packet's destination, typically called the medium access control (MAC) address. Generally speaking, bridges do not modify the packets. Bridges forward packets in a flat network having no hierarchy without any cooperation by the end-stations.

Hybrid forms of network elements also exist, such as "brouters" and switches. A "brouter" is a router which can also perform as a bridge. The term switch refers to a network element which is capable of forwarding packets at high speed with functions implemented in hardwired logic as opposed to a general purpose processor executing instructions. Switches come in many types, operating at both Layer-2 and Layer-3.

A layer-2 switch (or bridge) determines the destination physical port based on layer-2 header (more specifically destination MAC address), and the packet stays intact (without any change) when it is forwarded out. A layer-3 router determines the destination physical port based on layer-3 header (destination IP address), and the layer-2 header (source MAC address and destination MAC address) of the packet is replaced with new values when it is forwarded out. A router can work as a bridge and router simultaneously. When a packet comes in, it performs a layer-2 switch or layer-3 routing based on its destination MAC address.

FIG. 1 illustrates an encapsulated data packet known in the prior art, specifically an encapsulated IP packet 100. The encapsulated IP packet 100 includes an IP packet encapsulated by a layer-2 MAC header 102. The IP packet includes a layer-3 IP header, a layer-3 header, and a payload, which is a data destined for a recipient identified by the layer-3 address and the layer-4 address.

FIG. 2 illustrates a prior art MAC header 200. The MAC header includes a destination MAC address, a source MAC address and an ether type information. If the ether type equals 0x0800 (hex), then the layer-3 address has an IPv4 format; if the ether type equals 0x86dd (hex), then the layer-3 address has an IPv6 format.

Generally each end-station on a network is assigned an address and the address most commonly used is IP address. Currently the most widely used addresses follow the IPv4 format. The IPv4 format uses 32-bit addresses, limiting it to 4,294,967,296 unique addresses, many of which are reserved for special purposes such as local networks or multicast addresses, reducing the number of addresses that can be allocated as public Internet addresses. A prior art header for the IPv4 format is illustrated in FIG. 3.

FIG. 4 illustrates a prior art IPv6 protocol. IPv6 is a new protocol meant to replace the existing IPv4 format, which is the major layer-3 protocol for the current Internet. Since the installed base of the IPv4 format is huge, the IPv6 format is slowly becoming used. There will be some transitions before IPv6 is deployed all over the world. It is possible that a private LAN is using the IPv6 format, but the ISP is using the IPv4 format. I such case, the IPv6 packet can be carried within an IPv4 packet via a tunnel set up by the gateway as illustrated by the prior art data packet in FIG. 5. Another scenario is that an IPv6 host wants to talk to an IPv4 host through an IPv4 network. In this case, the IPv6 header will be translated into an IPv4 header by the gateway in order for the two parties to communicate successfully. Consequently, the IPv6/IPv4 tunnel and translation are needed in current and future gateways.

Because of the scarcity of the IPv4 address space caused by reserving IPv4 format addresses to private networks or multicast addresses, it is very common for many computers inside a private network, such as a home or office, to have internal private network addresses. When the internal computers access someone outside over the Internet, the private network address is translated into a public network address, such as an IP address. Network Address/Port Translation (NAPT) is a technique for many hosts to share fewer public IP addresses. Because many hosts can share one single IP address, the layer-4 port number is used to distinguish an actual internal host. It is heavily used in a gateway application. A gateway is a device sitting between a private network and a wide area network, e.g. the Internet. When a packet comes in from a private LAN port of a gateway, the gateway determines the destination physical port based on the packet's destination network address, and then applies NAPT to generate a new source network address and port number. When a packet comes in from a WAN port of the gateway, the gateway first applies NAPT to generate a new destination network address and port number, and then determines a destination physical port number.

A network address may have different format depending on the protocol used by the network and it may need to be translated when a packet moves from one network to another. Point-to-Point Protocol (PPP) over Ethernet (PPPoE) is a protocol commonly used between an Internet Service Provider and its end users. The prior art PPPoE packet format and the PPPoE header are shown in FIG. 6. PPPoE is not generally used inside a home/office network; therefore, a gateway may need to perform a PPPoE packet encapsulation/decapsulation if necessary. Other commonly used protocols are transfer control protocol (TCP) and user datagram protocol (UDP). Both UDP and TCP are layer-4 protocols and their prior art header information are shown in FIG. 7 and FIG. 8 respectively.

Another issue when dealing with interfacing a private network and a public network is the Quality of Service (QoS) issue for certain real time applications. Under QoS guarantee, the packets belonging to real time applications, such as video and audio, should be transmitted as soon as possible no matter if the network is congested or not. To provide QoS guarantee, a gateway must be able to classify packets into difference classes so that important packets will not be disturbed by non important packets, and there must be some scheduler to select a packet from different classes to serve.

In summary, a gateway needs to check layer-2, layer-3, and layer-4 headers in a data packet in order to determine a destination physical port through which to forward the data packet, and when the data packet is forwarded out, the layer-2, layer-3 and layer-4 headers of the data packet will be replaced with new header information. While the incoming header information is checked and new header information is generated, the gateway must also be able to provide the QoS guarantee. Therefore, it is desirous to have an apparatus and method that handles incoming data packets in a fast and efficient way, and at the same time providing the QoS guarantee and it is to such apparatus and method the present invention is primarily directed.

SUMMARY OF THE INVENTION

Briefly described, the invention is a system and method of the invention receive data packets from a plurality of sources and forward them with quality of service and rate control. The header information of each data packet is extracted and compared against a plurality of tables. New header information is assembled based on the comparison results. The new header information may be dropped if certain conditions are met. The data packets have their headers replaced by the new header information on the fly before being sent to their destinations.

In one embodiment, an apparatus of the invention processes data packets received from a data network and forwards the data packets to their destination according to a predefined transfer rate. The apparatus includes at least one lower layer processing unit, a header extracting unit, a plurality of tables, a search engine arbiter unit, a plurality of output queues, an early random drop unit, and a plurality of transfer units. The lower layer processing unit receives data packets from an external source and stores the data packets into an external memory buffer. The header extracting unit is in communication with the lower layer processing unit and capable of extracting header information from each received data packet. Each of the plurality of tables has a plurality of entries of table information. The search engine arbiter receives the extracted header information from the header extracting unit and compares the extracted header information against the plurality of tables. The search engine is also capable of creating new header information for each received data packet based on comparison results and discarding the extracted header information based on the comparison results. Each output queue has an output rate and an availability indicator of queuing additional data. The random early drop module receives the extracted header information from the search engine arbiter and distributes the extracted header information among the plurality of output queues. The random early drop module also monitors the availability indicator in each output queue and is capable of discarding the extracted header information. The plurality of transfer rate control modules receives the extracted header information from the plurality of output queues and each transfer rate control module is in communication with an output queue and controlling the output rate for the output queue. The lower layer processing unit also receives the extracted header information and retrieves the data packet identified by the extracted header information and transmits the data packet to the destination identified in the new header information.

In another embodiment, a method of the invention processes data packets from a data network and forwards the data packets to a destination according to a predefined transfer rate. The method includes receiving a plurality of data packets from a plurality of sources at the device, extracting a header information from each of the plurality of data packets, and comparing the extracted header information with at least one table. If the extracted header information matches one entry in the at least one table, a new header information is created for each of the plurality of data packets; if the extracted header information does not match any entry in the at least one table, the extracted header information is discarded. The method further includes transmitting the extracted header information to a random early drop module in the device, distributing the extracted header information among a plurality of queues, discarding the extracted header information from a queue if the output rate of the queue exceeds a predefined criterion, inserting the new header information in the data packet, and transmitting the data packet to the destination listed in the new header information.

In yet another embodiment, a gateway of the invention processes data packets received from a plurality of data network and forwards the data packets to their destination according to a predefined transfer rate. The gateway includes a plurality of lower layer processing units, a header extracting unit, at least one table with traffic information, a search engine arbiter unit, a flow control unit, and a plurality of output control units. Each lower layer processing unit connects to at least one data link and receives data packets from at least one data link. The header extracting unit is in communication with the plurality of lower layer processing units and capable of extracting header information from the data packets received by the plurality of lower layer processing unit. The search engine arbiter unit compares the extracted header information received from the header extracting unit with the table of traffic information and generates a new header related information based on comparison results. The flow control unit receives the extracted header information from the search engine arbiter unit and discards the data packet associated with the extracted header information according to a predefined criterion. The plurality of output control units receives the extracted header information from the flow control unit and distributes the extracted header information to a lower layer processing unit, wherein the lower layer processing unit transmits a data packet associated with the extracted header information to a destination after inserting the new header related information in the data packet.

The present system and methods are therefore advantageous as they enable data packets be forwarded expeditiously according to a quality of service guarantee. Other advantages and features of the present invention will become apparent after review of the hereinafter set forth Brief Description of the Drawings, Detailed Description of the Invention, and the Claims.

DETAILED DESCRIPTION OF THE INVENTION

In this description, the terms "packet," and "header" are used interchangeably, and the terms "search result" and "new header related information" are used interchangeably. The term "application" as used herein is intended to encompass executable and nonexecutable software files, raw data, aggregated data, patches, and other code segments. Further, like numerals refer to like elements throughout the several views, and the articles "a" and "the" includes plural references, unless otherwise specified in the description.

Figure 1:
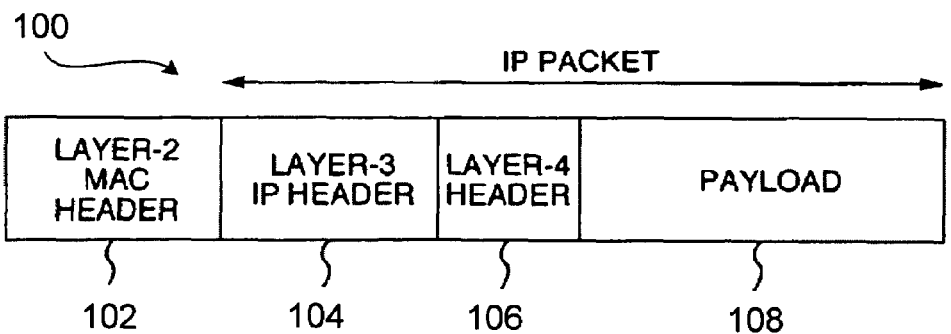
FIG. 1 depicts a prior art encapsulated data packet.
Figure 2:
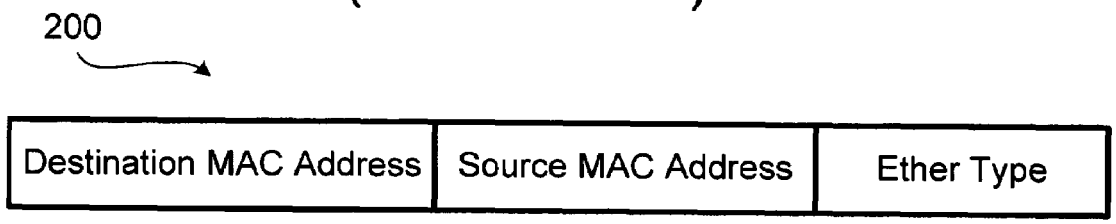
FIG. 2 depicts a prior art MAC header.
Figure 3:
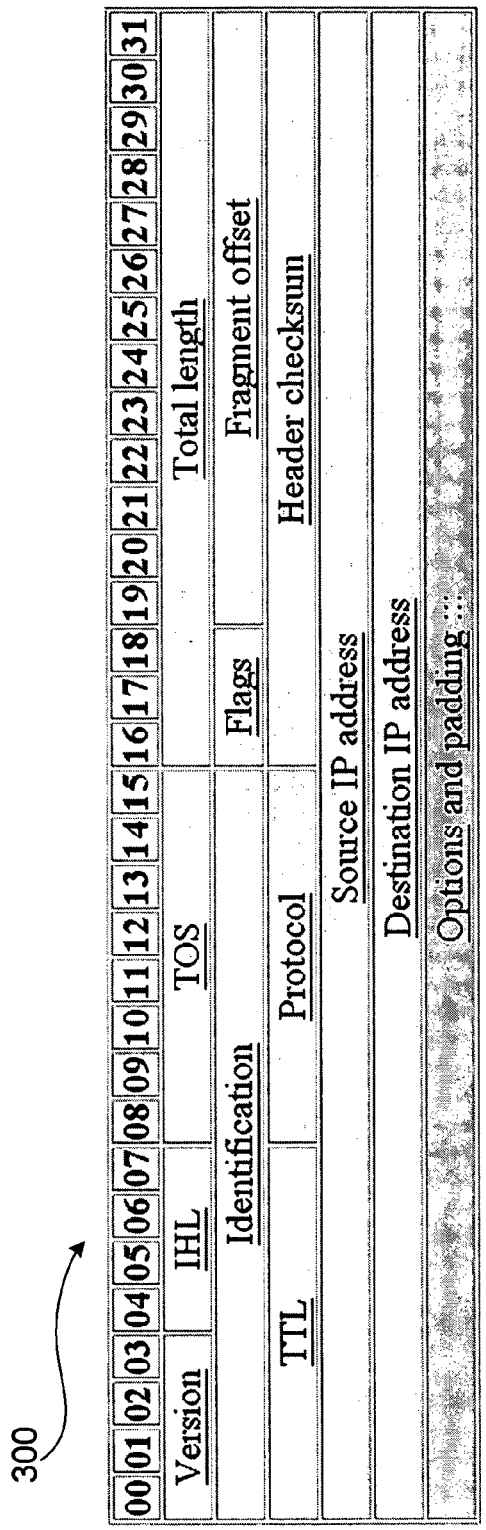
FIG. 3 depicts a prior art header in the IPv4 format.
Figure 4:
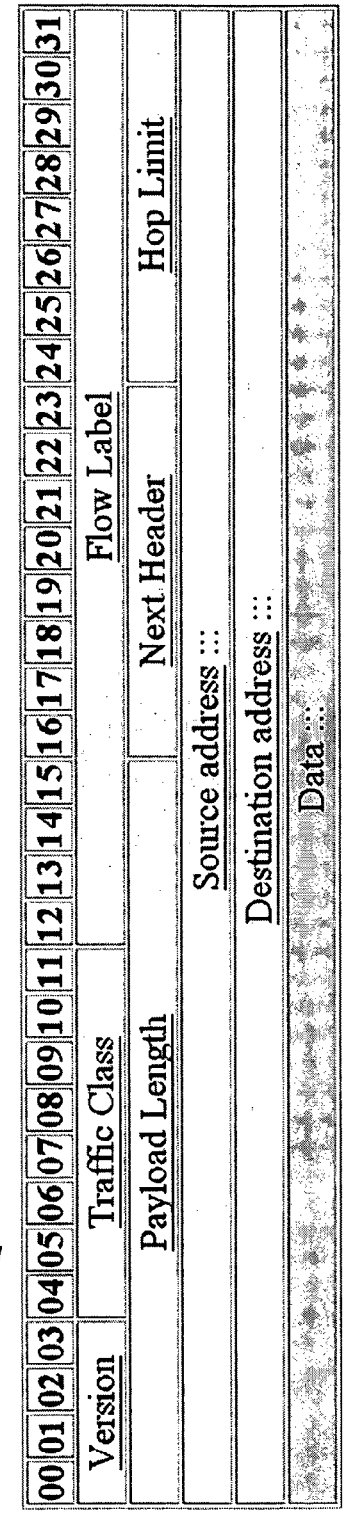
FIG. 4 depicts a prior art header in the IPv6 format.
Figure 5:
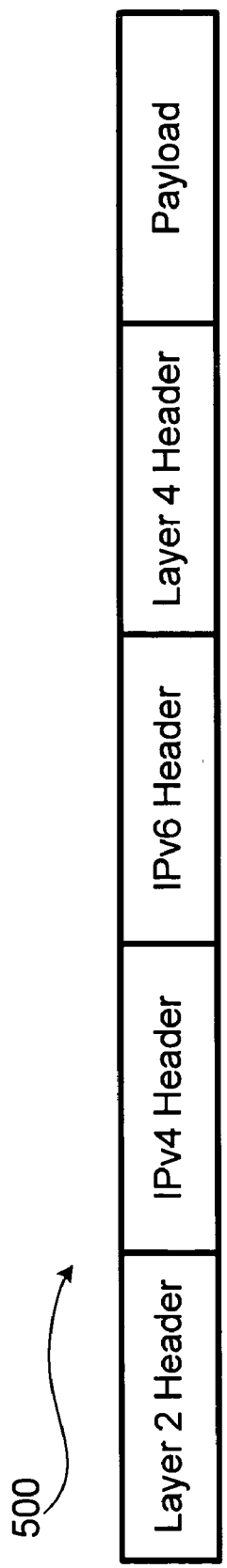
FIG. 5 depicts a prior art IPv6 in IPv4 tunnel packet format.
Figure 6:
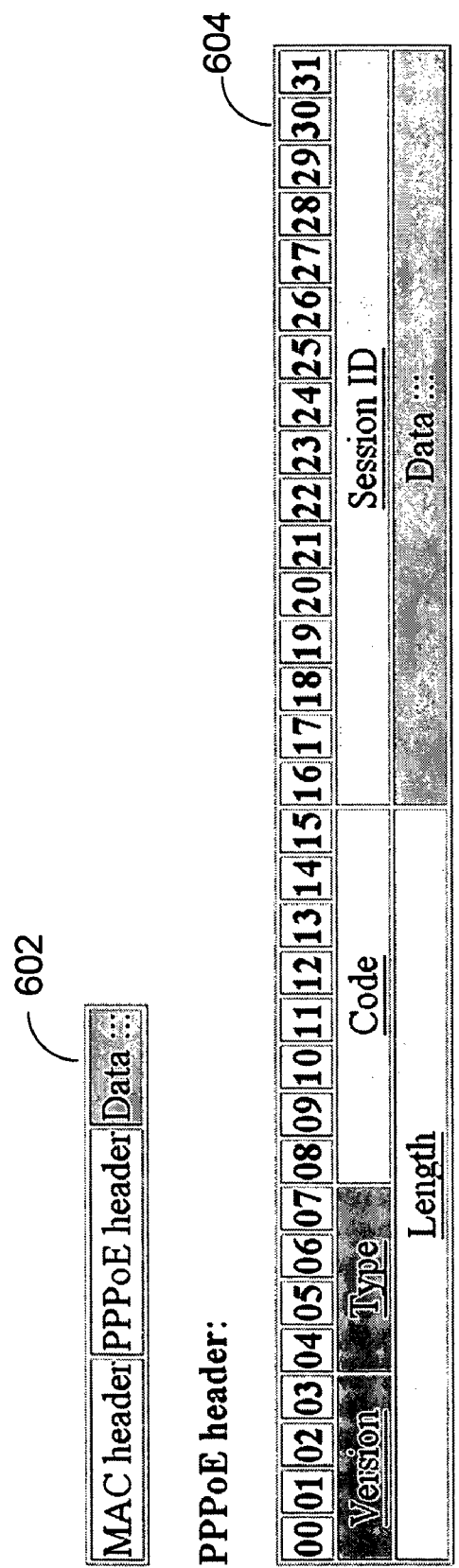
FIG. 6 depicts a prior art PPPoE packet format and corresponding PPPoE header.
Figure 7:
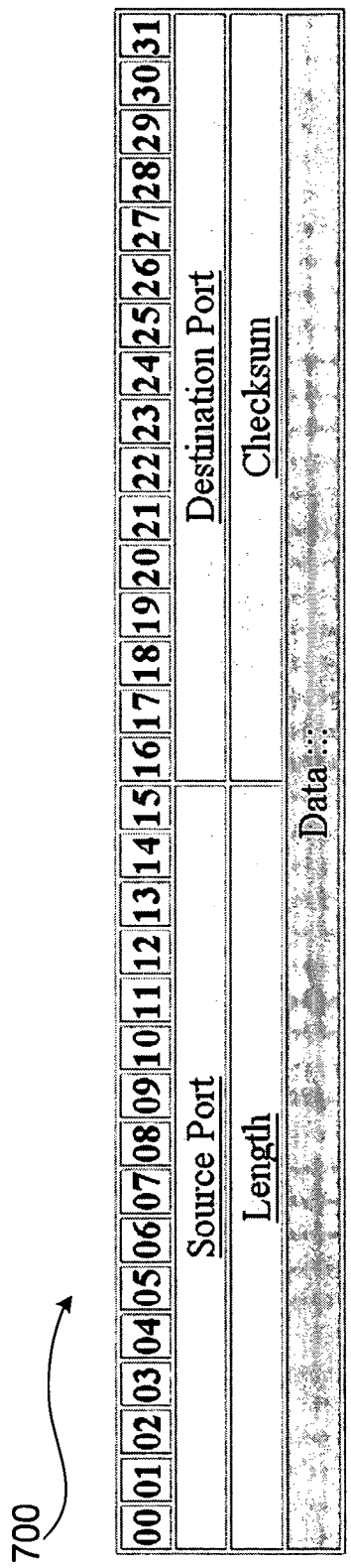
FIG. 7 depicts a prior art UDP header.
Figure 8:
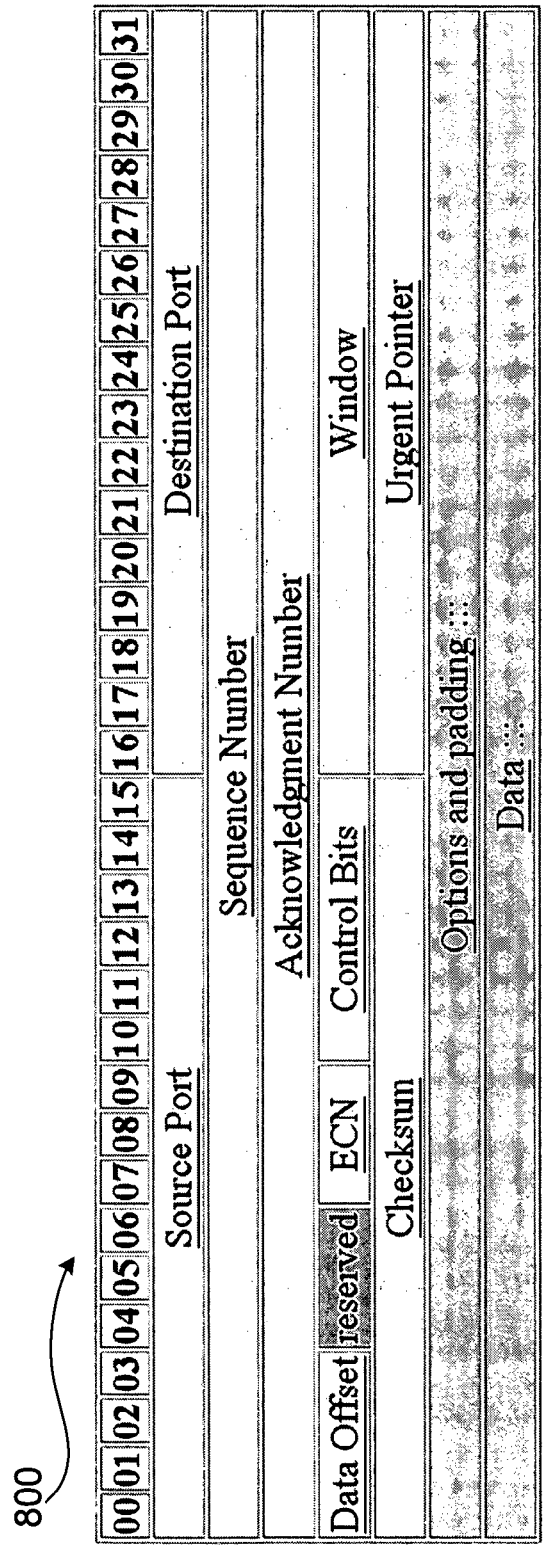
FIG. 8 depicts a prior art TCP header.
Figure 9:
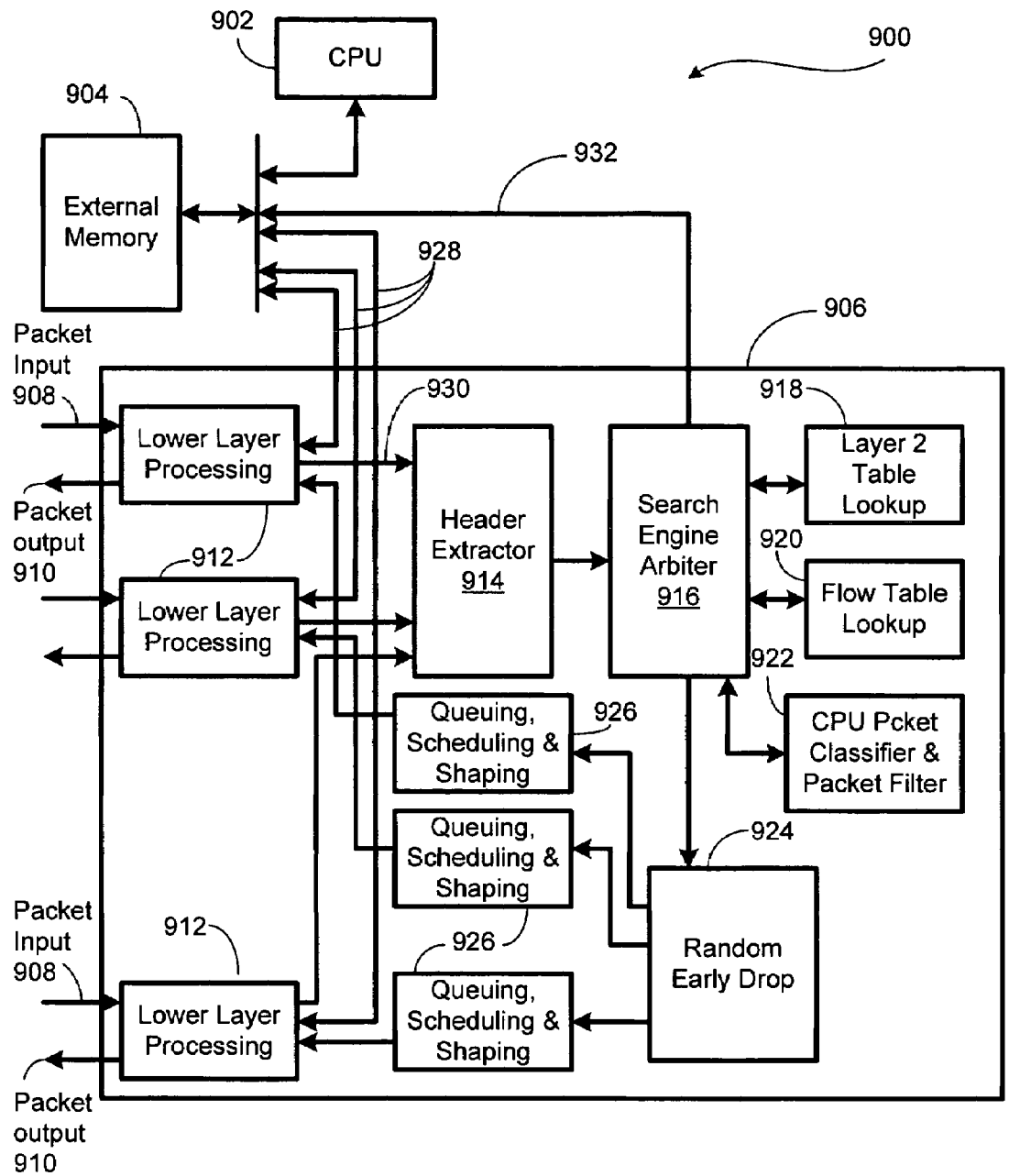
FIG. 9 illustrates an architecture of an apparatus according to one embodiment of the invention.

In overview, an apparatus and method according to the invention enable an efficient hardware based data packet forwarding in a gateway server, wherein the gateway server receives data packets having different formats from different data networks and forwards them to their destinations after translating the header in each data packet. FIG. 9 illustrates an architecture 900 of an apparatus 906 according to one embodiment of the invention. The apparatus 906 receives data packets from a plurality of lower layer processing units 912, where each lower layer processing unit 912 has a packet input 908 and a packet output 910 and is in communication with an external source through a pair of data links. Alternatively, the lower layer processing unit 912 maybe in communication with the external source or destination through a single bidirectional physical link. When a data packet comes in from the physical layer, the lower layer processing unit 912 is responsible to receive the packet correctly and put it into a packet buffer 904, which is a big chunk of memory, usually a synchronized dynamic random access memory (SDRAM). The SDRAM can be shared with the central processing unit 902 (CPU) and the advantage of sharing the SDRAM is that the total system cost is minimized.

After a data packet is received from the physical layer (link) by the lower layer processing unit 912, a Header Extractor 914 parses the packet, extracts layer-2, layer-3, and layer-4 header information from the packet, and passes them to a Search Engine Arbiter 916. The Search Engine Arbiter 916 coordinates the lookup of three tables, performs Denial of Service (DoS) Attack prevention, merges the search result from the three tables, and writes back the merged search result to the external SDRAM 904. The three tables controlled and used by the Search Engine Arbiter 906 are Layer-2 table 918, flow table 920, and packet classifier and filter table 922. These three tables contain network traffic related information and determine how a data packet is processed and how new header information is generated. The Layer-2 table 918 will be explained in more detail in FIG. 12; the flow table 920 will be explained in more detail in FIG. 13; the packet classified and filter table 922 will be explained in more detail in FIG. 14.

For the layer-2 table 918 lookup, the Search Engine Arbiter 916 checks if the source MAC address of the packet matches the MAC address field of an entry in the layer-2 table 918. If the source MAC address matches one entry in the layer-2 table 918, the packet is dropped if the source filter bit is enabled in this entry. If the destination MAC address of the packet matches the MAC address field of an entry, the search result is SUCCESS and the physical port information of the matching entry is returned back to the Search Engine Arbiter 918.

The Search Engine Arbiter 916 uses the source/destination IP address and source/destination port number as the key to search the flow table 920. If there is a match in the flow table 920, the search result is SUCCESS and other fields in the same entry are returned back to the Search Engine Arbiter 916. These fields include new destination MAC address, new source/destination IP address, new source/destination port number, class of the packet, PPPoE header insertion/removal (and PPPoE session ID if insertion), and necessary information needed for IPv4/IPv6 translation/tunnel.

If there is no match in the flow table 920, it may mean that the apparatus 906 can not directly handle/forward the packet; the packet needs to be sent to CPU 902 for further processing by the software. Thus, the Search Engine Arbiter 916 activates the CPU Packet Classifier and Filter unit 922. The CPU Packet Classifier and Filter unit 922 can match a range of source/destination IP address, and/or a range of source/destination port number, Ethertype value, and protocol number in an IP header. The CPU Packet Classifier and Filter unit 922 can be configured to ignore matches in any particular field. If there is a match in the CPU Packet Classifier and Filter unit 922, the search is SUCCESS, the CPU Packet Classifier and Filter unit 922 returns back to Search Engine Arbiter two pieces of information: 1) whether to drop the packet and 2) if the packet is not dropped, the identity of the queue through which the packet is forwarded to CPU. The "drop the packet" decision can be used as a packet filter, which is one of the functions commonly seen in firewall devices. It also further offloads the CPU 902, since potential attacking/intrusion packets can be dropped by the hardware (the apparatus 906) directly.

The Search Engine Arbiter 916 also performs some basic check on the packets such as IP/TCP/UDP checksum verification and recalculation (since some fields in the IP/TCP/ UDP header are modified, checksum requires recalculation), checks if the TTL (time-to-live field in an IP header) is 0 (if so, the packet should also be dropped according to the Internet standard). After all these works are done, the Search Engine Arbiter 916 merges the result into 64-bytes (see FIG. 11 for the detailed representation), and write back to the very beginning of the packet buffer. The Search Engine Arbiter 916 can handle multiple header information from multiple packets in a pipeline fashion, i.e., while a header information is compared against the flow table, the header information from another packet is compared with the Layer-2 table. Thus, the throughput from the Search Engine Arbiter 916 is maximized. The function of the Search Engine Arbiter 916 will be explained in more detail in FIGS. 15A-15B.

Figure 11:
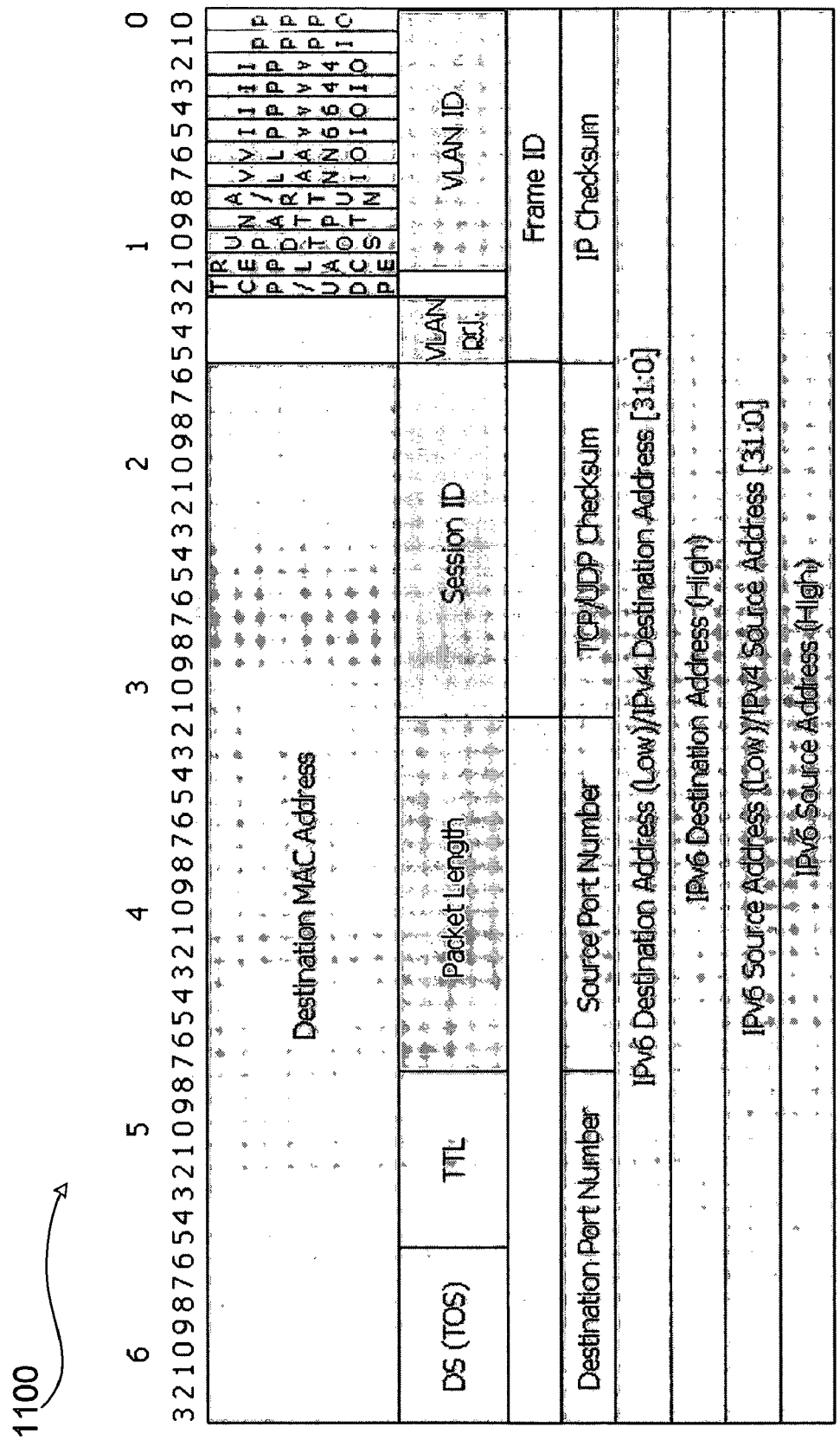
FIG. 11 depicts a new header related information stored in first 64-byte on a data packet.

After the Search Engine Arbiter 916 processed the extracted header information, a new set of header related information is generated and written in the first 64 bytes of the packet buffer, as shown in FIG. 11, where the corresponding data packet is stored. The new header related information is generated by the Search Engine Arbiter 916 based on the information returned from looking up the three tables. The Search Engine Arbiter 916 also sends the extracted header information and output information to the Random Early Drop (RED) module 924. The output information includes a buffer handle for the packet, a physical destination output port for the packet, a class of the queue to which the packet will be sent, and a packet length. The RED module 924 has the information of all queues, such as availability in each queue, and is responsible for control the flow of data packets by deciding whether a packet can be added to the targeted port and queue. If there is no room in the destination queue, the RED module 924 can drop the packet directly. The RED module 924 will also drop the packet if its "discard" bit is set. The RED module 924 will start to drop packets when the queue is almost, but not totally occupied. This approach avoids "global synchronization" phenomenon and congestion avoidance.

Figure 10:
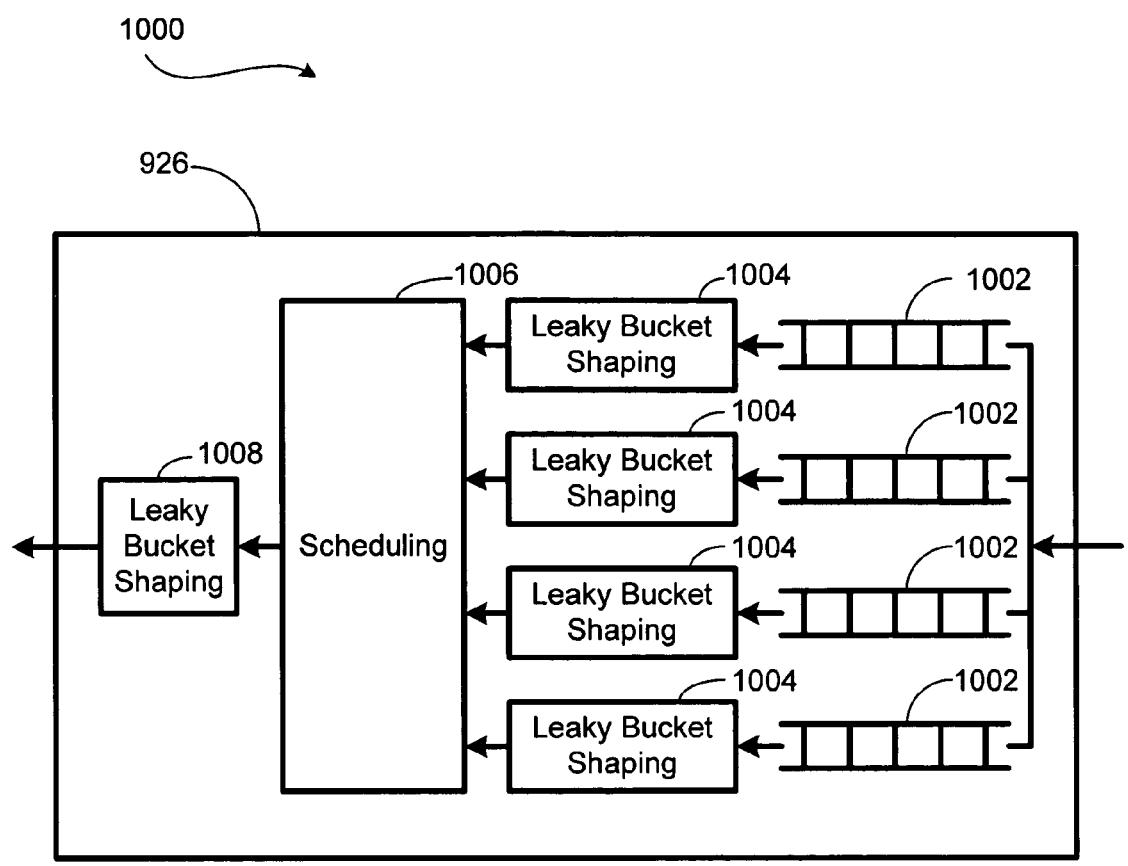
FIG. 10 illustrates an expansion of a queuing, scheduling and shaping module of FIG. 9.

If RED module 924 decides that the packet can stay, the output information mentioned above is sent to the particular output queue as specified. The output queue 1002 is inside the queuing, scheduling and shaping module 926 and shown in more detail in FIG. 10. The queuing, scheduling and shaping module 926 is an output control unit and regulates the data packet outputs. The queuing, scheduling and shaping module 926 includes a plurality of output queues 1002, a plurality of Leaky Bucket Shaping modules 1004, a Scheduling module 1006, and an overall Leaky Bucket Shaping module 1008. In front of each output queue 1002, there is a Leaky Bucket Shaping module 1004, which is used to control the output rate of each output queue 1002. The Leaky Bucket Shaping module 1004 (also known as transfer rate control module) enforces the output rate according to the following formula:

At any time t, the sum of the packet length outputted P(t) is less than A*t+B $$P(t)<=A*t+B \qquad (1)$$

where A is a parameter representing the desired average rate of the queue, and

B is the bucket size representing the maximum burstiness the queue can have.

When a packet becomes the head of line in the queue, the leaky bucket module checks if it conforms to the above formula, if not, the packet will be kept in the queue for a certain period of time until it conforms to formula (1). In this way, a user can control the traffic behavior of each queue.

The function of the Scheduling module 1006 is to select one of the head-of-line packets (from all of the output queues)

for transmission. In one embodiment, two scheduling algorithms are used to pick packets for transmission: (1) combined strict priority and weighted fair queuing (WFQ) and (2) pure weighted fair queuing. In the first algorithm, combined strict priority and WFQ, one of the output queues 1002 is designated as the most important queue, and the packet will be selected to go out whenever there is a packet in this queue (of course it still under the constrain of the leaky bucket shaping module 1004). The rest of the queues will be served in a weighted fair manner. The weighted fair manner means that the total sum of packet length outputted for each queue 1002 will conform to certain ratio in the long run. For example, if there are 3 queues (1, 2 and 3), and if the weight of each queue are set to be 4, 2, and 1 respectively. Then after a certain period of time, if queue 1 has transmitted 4 MB of data, then queue 2 must have transmitted around 2 MB and queue 3 must have transmitted around 1 MB. The scheme allows user to put delay sensitive data into the most important queue, and other traffics can share the bandwidth in a pre-defined ratio. For example, user can configure a hyper-text transfer protocol (HTTP) traffic to use 50% of the bandwidth, a file transfer protocol (FTP) traffic to use 20%, others traffics to use 10%. For the second algorithm, pure weighted fair queue, all of the output queues are configured with weighted fair manner.

After Scheduling module 1006 has selected a packet to be forwarded, there is an overall leaky bucket shaping module 1008 that controls the average rate and burstness of the aggregated output link. The leaky bucket module 1004 of each queue 1002 controls one single separate queue 1002; the overall leaky bucket module 1008 controls one output link (which may have many queues). The overall leaky bucket module 1008 regulates the traffic of a single uplink so that the traffic on the uplink conforms to a quality of service (QoS) of a service level agreement between a service provider and end customer. The predefined transfer rate, i.e., QoS, is achieved through the combined effort of the Scheduling module 1006 and leaky bucket modules 1004 and 1008.

When a packet passes through the overall leaky bucket module 1008, it is ready for transmission. It is then sent to the lower layer processing unit 912 along with its packet buffer handle. The lower layer processing unit 912 reads in the header related information that is in the first 64-byte of the packet buffer, and reads the packet data. The lower layer processing unit 912 takes information from the first 64-bytes and insert them into different sections of the data packet replacing certain fields as defined in the 64-byte header related information. The insertions and replacements are done on the fly when a packet is being transmitted. While the packet stays in the packet buffer 904, it stays intact, and it is modified only while it is being transmitted. When a packet or an extracted header information is discarded, dropped, or filtered out, the corresponding packet that is stored in the external memory is also discarded and the buffer made available to next data packet. This approach eliminates unnecessary data movement and wastes no memory bandwidth.

In one embodiment, the search result (new header related information) is located at the first 64 bytes (FIG. 11) of a packet buffer. Each packet buffer occupies 2 KB of memory, where bytes 1-64 are used to store search result, and bytes 65-2048 are used to store the actual packet data. The search result occupies a lot of space because a gateway in which the invention is likely used performs a lot of packet field replacements, and format translations. By putting the search result to an external SDRAM, instead of inside the chip, the chip size and cost are greatly reduced.

Figure 12:
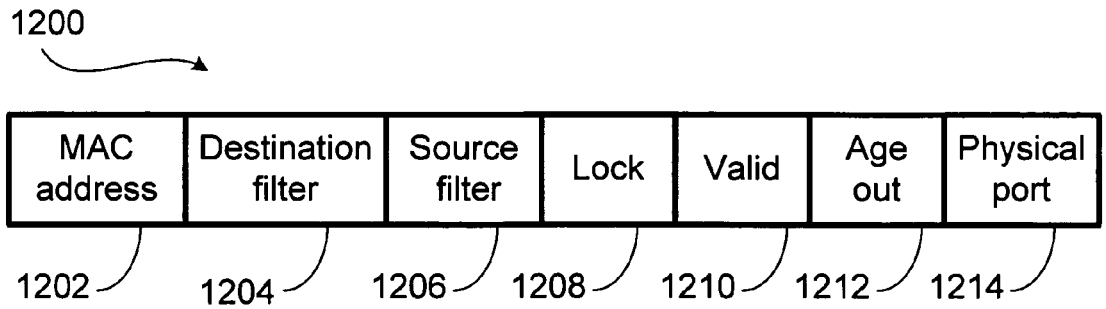
FIG. 12 illustrates an entry of a layer-2 table.

Now, directing the attention to the layer-2 table 918, an entry 1200 of which is shown in FIG. 12. The entry 1200 includes a MAC address, 1202, a destination filter 1204, a source filter 1206, a lock indicator 1208, a validity indicator 1210, an age out indicator 1212, and a physical port indicator 1214. The MAC address 1202 is used to compare with the destination MAC address in a layer-2 header. When the destination filter 1204 is enabled, the destination MAC address from the incoming packet is compared with the MAC address 1202. If the destination MAC address of the packet matches the MAC address 1202, then the search is a success and the physical port indicator 1214 is returned to the Search Engine Arbiter 916. If the source filter 1206 is enabled, the source MAC address from the incoming packet is compared with the MAC address 1202. If the source MAC address of the packet matches the MAC address 1202, then the packet will be dropped. The lock indicator 1208, if enabled, indicates that the entry will not be aged out, i.e., the entry will not be removed from the table for being an old entry. The validity indicator 1210 indicates whether the entry is a valid entry. The age out indicator 1212, if enabled, indicates that the entry has been aged out. The physical port indicator 1214 indicates which physical port of the apparatus 906 has this MAC address.

Figure 13:
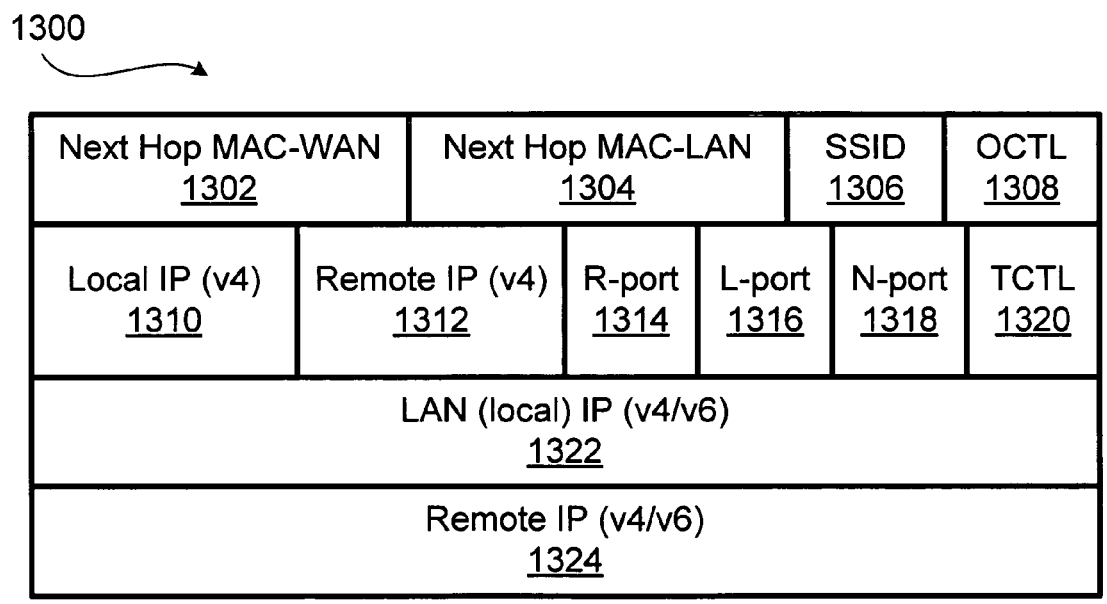
FIG. 13 illustrates an entry of a flow table.

FIG. 13 illustrates an entry 1300 in the flow table 920. The format 1300 includes the following fields:

Next Hop MAC-WAN 1302—WAN port next hop destination MAC address
Next Hop MAC-LAN 1304—LAN port next hop destination MAC address
SSID 1304—PPPoE Session ID
Local IP (v4) 1310—source IPv4 address in private LAN
Remote IP (v4) 1312—destination IPv4 address in WAN
R-port 1314—remote port number
L-port 1316—local port number
N-port 1318—new port number
LAN (local) IP (v4/v6) 1322—new IPv4 address or LAN IPv6 source IP address
Remote IP (v4/v6) 1324—tunnel IPv4 address or WAN IPv6 destination IP address
OCTL 1308, where
    OCTL[15:8]=TOS
    OCTL[0]=PPPoE; If the WAN traffic will be encapsulated in PPPoE
    OCTL[2:1]=Class; Indicate transmit priority
    OCTL[6]=LAN port; Indicate the output port for ingress traffic
    OCTL[7]=WAN port; Indicate the output port for egress traffic
TCTL 1320, where
    TCTL[15:8]=reserved
    TCTL[0]=IPv4 Tunnel entry
    TCTL[1]=NAT entry
    TCTL[2]=Routing entry
    TCTL[3]=IPMC entry
    TCTL[4]=LAN is IPv6
    TCTL[5]=WAN is IPv6
    TCTL[7]=Protocol: 0=TCP; 1=UDP Each entry of the flow table 920 has a mode associated with it. The mode is represented by TCTL [0:7] as described above. Each mode represents a flow and network condition. For example, in one embodiment, TCTL[0] is set when the public network uses a format different from the format used by the private network.
TCTL[1] is set when the translation of the network address and the port number are needed, such as in a situation when multiple devices in a private network sharing a common public network address.

The flow table look up can be further illustrated in the following table 1 and corresponding explanation.

TABLE 1

| do nat | do nat 64 | Do nat 46 | do tunnel | do route | do ipmc | to WAN | Case Description |
|---|---|---|---|---|---|---|---|
| V | | | | | | | NAT ingress |
| V | | | | | | V | NAT egress |
| | | | | | V | x | IPv4 IPMC |
| | V | | | | | | v6 WAN v4 LAN NATPT ingress (include IPMC) |
| | | V | | | | V | v6 WAN v4 LAN NATPT egress (include IPMC) |
| | | V | | | | | v4 WAN v6 LAN NATPT ingress (include IPMC) |
| | | V | | | | V | v4 WAN v6 LAN NATPT egress (include IPMC) |
| | | | | V | | x | v6 to v6 route (include v6 IPMC) |
| | | | V | | | | IPv6 in IPv4 tunnel ingress |
| | | | V | | | V | IPv6 in IPv4 tunnel ingress |

TCTL[2] is set when there is no need to translate the network address or the port number, such as in a situation when a plurality of public network addresses are available to a plurality of devices in a private network.
TCTL[3] is set for a multicast situation when the source network address and port number need to be translated.
TCTL[4] is set when the private network uses IPv6 format.
TCTL[5] is set when the public network uses IPv6 format.
TCTL[7] is 0 when the protocol is TCP and 1 when the protocol is UDP.
The flow table look up is performed as follows:
Field Matching
IPv4 NAT: (when TCTL[1] is set)
　From WAN: Match (1),(2),(5),(7); output (3),(6)
　From LAN: Match (3),(4),(5),(6); output (1),(7)
IPv4 LAN NATPT: (when TCTL[1] is set and TCTL[5] is set)
　From WAN(v6): Match (3),(4),(5),(7); output (1),(2),(6)
　From LAN(v4): Match (1),(2),(5),(6); output (3),(4),(7)
IPv6 LAN NATPT: (when TCTL[1] is set and TCTL[4] is set)
　From WAN(v4): Match (1),(2),(5),(7); output (3),(4),(6)
　From LAN(v6): Match (3),(4),(5),(6); output (1),(2),(7)
Tunnel: (when TCTL[0] is set)
　From WAN: (1),(2),(3),(4),(5),(6); output "match"
　From LAN: (3),(4),(5),(6); output (1),(2)
IPv6 Route: (when TCTL[2] is set, TCTL[4] is set, and TCTL[5] is set)
　Match (3),(4),(5),(6); output "match
IPMC NAT: (when TCTL[3] is set)
　From WAN: Match (1),(2),(5),(6); output "match"
　From LAN: Match (3),(4),(5),(6); output (1)
IPMC LAN NATPT: (when TCTL[3] is set or when TCTL[1] is set and either TCTL[4] or TCTL[5] is set)
　Same as unicast NATPT traffic
An example of the flow table look up is described herein. When a data packet is received from a local area network (LAN), i.e. a private network, its header information is extracted by the Header Extractor unit 914, and passed to the Search Engine Arbiter 916 for comparison. The Search Engine Arbiter 916 searches through all entries of the flow table 920. If an entry has TCTL[1] set, then the extracted header information is compared to the entry. If LAN IP 1322, Remote IP 1324, R-port 1314, and L-port 1316 match the corresponding elements from the extracted header information, then Local IP 1310 and N-port 1318 are returned to the Search Engine Arbiter 916.

NAT
　Egress:
　　Replace source IP (1)
　　Replace source I4 port (7)
　Ingress:
　　Replace destination IP (3)
　　Replace destination L4 port (6)
IPMC (v4 to v4)
　Change nothing (other than MAC, TTL)
v4 WAN v6 LAN NATPT (include IPMC)
　Egress:
　Replace IP header to v4 header.
　　Use source IP (1)
　　Use destination IP (2),
　　Replace source L4 port (7)
　Ingress:
　Replace IP header to v6 header.
　　Use source IP (4)
　　Use destination IP address (3)
　　Replace destination L4 port (6)
v6 WAN v4 LAN NATPT (include IPMC)
　Egress
　Replace IP header to v6 header.
　　Use source IP (3)
　　Use destination IP address (4)
　　Replace source L4 port (7)
　Ingress
　Replace IP header to v6 header.
　　Use source IP (2)
　　Use destination IP address (1)
　　Replace destination L4 port (6)
IPv6 Route (include IPMC)
　Change nothing (other than MAC, TTL)
IPv6inIPv4 tunnel
　Egress:
　　Insert an IPv4 header with new source (1), destination address (2)
　Ingress
　　Remove IPv4 header.
Field Setup
IPv4 NAT:
　Local Host IP in (3)
　Remote IP in (2) and (4)
　Access IP in (1)
　Local host port in (6)
　Remote port in (5)
　Translated port in (7)
　TCTL[5:0]=0b00_0010

IPv4 LAN NATPT:
  Local Host IP in (1)
  Remote IP (v4 equivalent) in (2)
  Remote v6 IP in (4)
  Access IP in (3)
  Local Host source port in (6)
  Remote port in (5)
  Translated port in (7)
  TCTL[5:0]=0b10_0010
IPv6 LAN NATPT:
  Local Host IP in (3)
  Remote IP (v6 equivalent) in (4)
  Remote IP (v4) in (2)
  Access IP in (1)
  Local Host source port in (6)
  Remote port in (5)
  Translated port in (7)
  TCTL[5:0]=0b01_0010
IPv6 in IPv4 Tunnel:
  Local Host IP in (3)
  Remote Host IP in (4)
  Local Tunnel terminal in (1)
  Remote Tunnel Terminal in (2)
  Local Host source port in (6)
  Remote port in (5)
  TCTL[5:0]=0b01_0001
IPv6 route:
  Local Host IP in (3)
  Remote IP in (4)
  Local Host source port in (6)
  Remote port in (5)
  TCTL[5:0]=0b11_0100
IPMC: (Same as all NAT cases other than the TCTL)
  TCTL[5:0]=0bxx_1000

Figure 14:
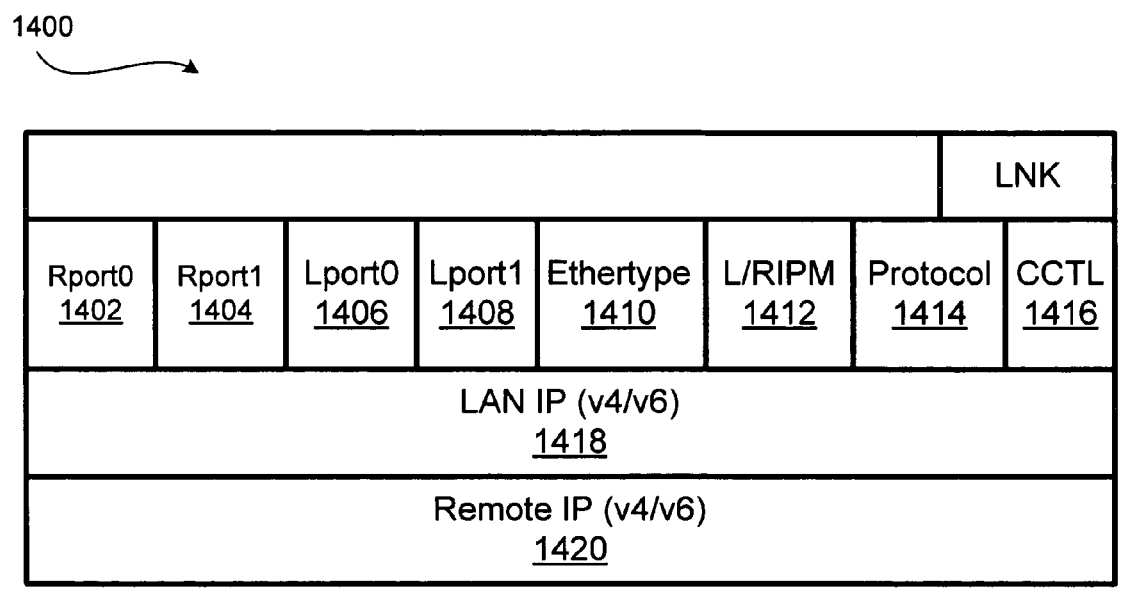
FIG. 14 illustrates an entry for a packet classified and filter table.

FIG. 14 illustrates an entry 1400 in the packet classifier and filter table 922 (also known as rule table). The format 1400 includes the following fields:
  Rport0~Rport1 1402, 1404: defines the range of destination port number a packet can match.
  Lport0~Lport1 1406, 1408: defines the range of source port number a packet can match
  Ethertype 1410: define the Ethertype value a packet can match
  L/RIPM 1412: source and destination IP mask a packet can match
  Protocol 1414: protocol number in the IP header a packet can match
  CCTL[0-20] 1416 where:
  CCTL[0]=L4 port match bi-directional
  CCTL[1]=L4 port match local or destination. (0: Match local AND remote)
  CCTL[2]=IP match bi-directional
  CCTL[3]=IP match local or destination. (0: Match local AND remote)
  CCTL[8]=Check if Ethertype match
  CCTL[9]=Check if remote IP match
  CCTL[10]=Check if local IP match
  CCTL[11]=Check if remote L4 port match
  CCTL[12]=Check if local L4 port match
  CCTL[13]=Check if protocol match
  CCTL[14]=Check if the source port apply
  CCTL[16]=Table is valid (Only valid entry can be linked!!)
  CCTL[17]=Filter the packet if match this rule
  CCTL[19:18]=Applied source port. (bit 18 for port 0; bit 19 for port 1)
  CCTL[21:20]=Priority class used to pass the packet if match this rule The packet classifier and filter table 922 is used in a manner similar to that of the flow table 920. However, some considerations are taken.
  Since the IPv4 will be aligned to the right of the IPv6, IP Mask for the IPv4 should be the number of bits in v4 address plus 96. For example, the net mask 255.0.0.0 with 8 matching bit should have the mask value 8+96=104.
  If check port number is enabled, only TCP or UDP traffic will be matched.
  Rule is arranged in a link list for easier priority management. Once a rule is matching the packet, the search will stop. LNK field bit 7 indicates the end of the link. The register LHEAD indicates the starting entry of the link.

Because the packet classifier and filter table 922 can be use in unidirectional case, the flow direction first must be determined first. From the primary direction,
  Set the source IP to the LAN IP(2)
  Set the destination IP to the Remote IP (1)
  Set the source L4 port range to Lport0/1 (4)
  Set the destination L4 port range to Rport0/1 (3)
  Lport0 should always be smaller or equal to Lport1. So as to the Rport0, Rport1

The packet classifier and filter table 922 look up can be further illustrated in the following table 2 and corresponding explanation.

TABLE 2

Matrix for matching L4 port/IP

| OR | BiDir | CL | CR | Case Description |
|---|---|---|---|---|
| x | x | 0 | 0 | Don't case both, always return match |
| x | 0 | 1 | 0 | Only match Lport with source port |
| x | 0 | 0 | 1 | Only match Rport with destination port |
| x | 1 | 1 | 0 | Match Lport with source or destination |
| x | 1 | 0 | 1 | Match Rport with source or destination |
| 0 | 0 | 1 | 1 | Match Lport with source AND Rport with destination |
| 0 | 1 | 1 | 1 | match (Lport with source AND Rport with destination) OR (Lport with destination AND Rport with source) |
| 1 | 0 | 1 | 1 | match Lport with source OR Rport with destination) |
| 1 | 1 | 1 | 1 | match Lport with source OR Rport with destination OR Lport with destination OR Rport with source |

OR: use OR for local/remote combination
BiDir: Match bi-directional
CL: Check Local
CR: Check Remote Now directing the attention to FIGS. 15A-B, where the Search Engine Arbiter 916 operations are explained in more detail. The Search Engine Arbiter 916 first check if any rules for denial of service (DoS) has been violated, step 1502. A set of DoS rules are implemented in hardware for the Search Engine Arbiter 916 use. The rules are:
  Rule 1. drop the packet if Src_IP=Dst_IP
  Rule 2. drop the packet if Src_IP=127.0.0.0
  Rule 3. drop the packet if Dst_IP=broadcast
  Rule 4. drop the packet if TCP_SYN=1 & Dst_IP=multicast
  Rule 5. drop the packet if TTL=0
  Rule 6. drop the packet if Protocol=TCP & Dst_Port=0
  Rule 7. drop the packet if Protocol=UDP & Dst_Port=0
  If the DoS rules have been violated, then the Search Engine Arbiter 916 sets a discard bit, step 1516, and the packet is sent to the RED module 924, step 1526. If the DoS rules have not been violated, then the Search Engine Arbiter 916 checks if the packet is a layer-2 broadcast, step 1504. If the packet is a layer-2 broadcast, the Search Engine Arbiter 916 sets a CPU processing bit, step 1510, and sends the packet to the packet classifier and filter table 922, step 1514. After checking for the layer-2 broadcast, the Search Engine Arbiter 916 checks whether the packet is a "split packet," i.e., whether the packet has a partial data and the rest of the data is split in another packet, step 1506. If that is the situation, the Search Engine Arbiter 916 sets a CPU processing bit, step 1510, and sends the packet to the packet classifier and filter table 922, step 1514. The Search Engine Arbiter 916 also checks if the destination of physical layer matches the address of the physical layer of the public network or the private network, step 1508. If the destination physical address matches one of the address of the physical layers, then the Search Engine Arbiter 916 processes the header information, step 1512, and sends the packet to the packet classifier and filter table 922, step 1514.

If the destination physical address do not match one of the address of the physical layers, then the Search Engine Arbiter 916 checks if special processing is needed, step 1518. The special handling can be set by the user through mode setting. After the special processing, step 1520, the Search Engine Arbiter 916 starts the packet classifier and filter table 922 look up, step 1521, and checks if a physical layer address is found, step 1522. If the physical layer address is found, the Search Engine Arbiter 916 determines if the packet should be filtered out, step 1524. If the packet is to be filtered out, the Search Engine Arbiter 916 sets a discard bit, step 1516, and the packet is sent to the RED module 924, step 1526. If the packet is not to be filtered out, the Search Engine Arbiter 916 sends it to the RED module 924 for further processing, step 1526.

If the physical layer address is not found, the Search Engine Arbiter 916 checks whether the content of the layer-2 table should be updated as part of an auto-learning process, step 1528. If the auto-learn is enabled, the packet is broadcasted, step 1532. If the auto-learn is disabled, the Search Engine Arbiter 916 sets a CPU processing bit, step 1530, and sends the packet to the packet classifier and filter table 922, step 1514. If the special processing is not needed, the Search Engine Arbiter 916 sets a CPU processing bit, step 1530, and sends the packet to the packet classifier and filter table 922, step 1514.

Figure 15A:
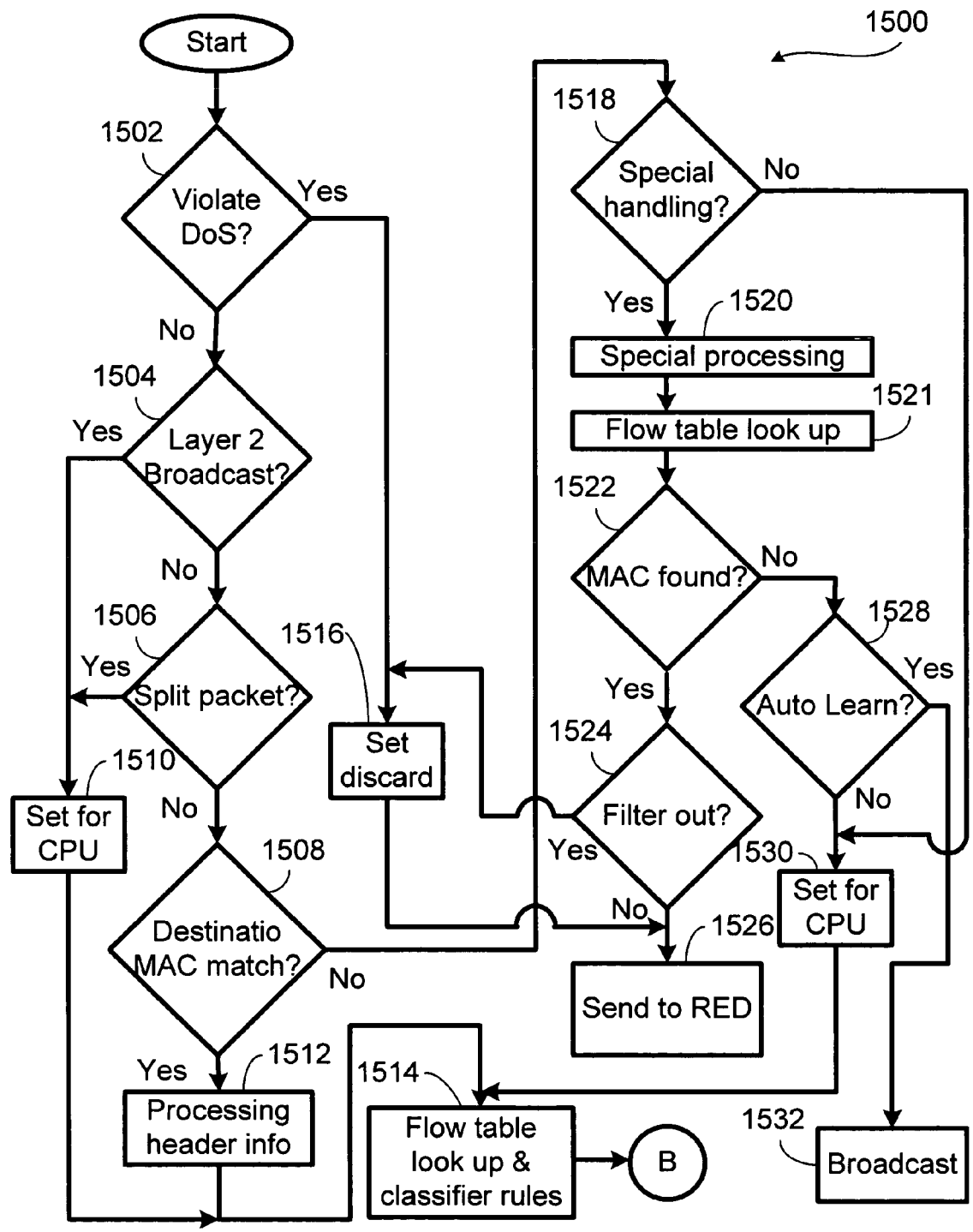
FIGS. 15A-15B illustrate operations of a Search Engine Arbiter.
Figure 15B:
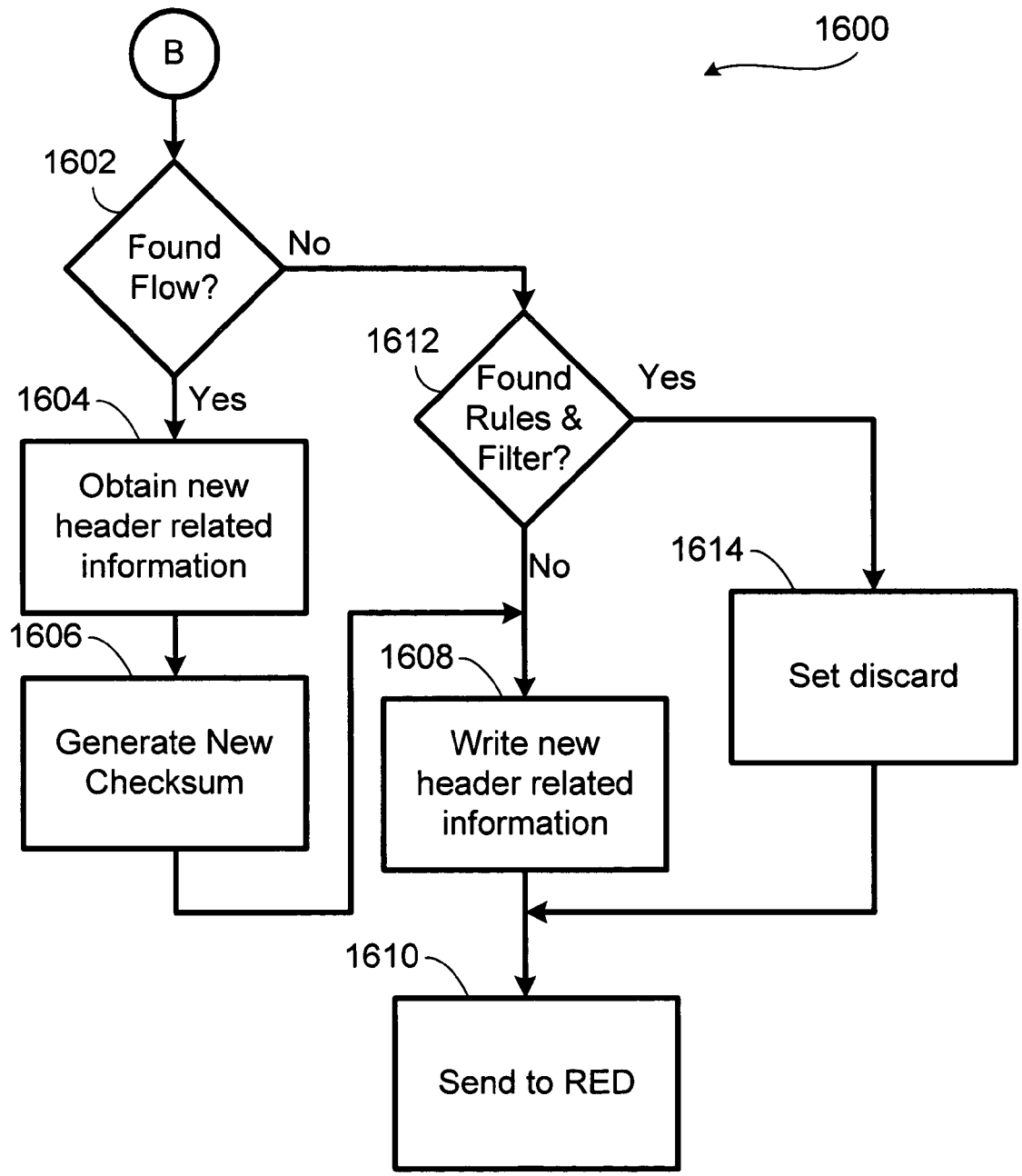

After the packet classifier and filter table 922 look up, the Search Engine Arbiter 916 checks if a flow is found, step 1602 (shown in FIG. 15B). If a flow is found, the Search Engine Arbiter 916 obtains new header related information, step 1604, and generates a new checksum for the packet, step 1606. After generating a new checksum, the Search Engine Arbiter 916 writes new header related information in the first 64 bytes of the packet buffer, step 1608, and sends the packet to the RED module 1610.

If no flow is found, the Search Engine Arbiter 916 checks if the packet should be filtered out, step 1612. If the packet is not to be filtered out, the Search Engine Arbiter 916 proceeds to write the new header related information as described above, step 1608 and sends the packet to the RED module 924, step 1610. If the packet is to be filtered out, the Search Engine Arbiter 916 sets the discard bit, and sends the packet to the RED module 924, step 1610. The packet is then processed by the RED module 924 and the rest of the circuit as described above.

In the context of FIGS. 15A-B, the steps illustrated do not require or imply any particular order of actions. The actions may be executed in sequence or in parallel. The method may be implemented, for example, by operating portion(s) of an electric circuit containing the invention, or by operating a CPU that executes a sequence of machine-readable instructions. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the invention has been particularly shown and described with reference to a preferred embodiment thereof, it will be understood by those skilled in the art that various changes in form and detail may be made without departing from the spirit and scope of the present invention as set forth in the following claims. Furthermore, although elements of the invention may be described or claimed in the singular, the plural is contemplated unless limitation to the singular is explicitly stated.

What is claimed is:

1. An apparatus for processing data packets received from a data network and forwarding the data packets to their destination according to a predefined transfer rate, the apparatus comprising:

at least one lower layer processing unit for receiving data packets from an external source and storing the data packets into an external memory buffer;

a header extracting unit in communication with the at least one lower layer processing unit, the header extracting unit capable of extracting header information from each received data packet;

a plurality of tables, each table having a plurality of entries of table information;

a search engine arbiter for receiving the extracted header information from the header extracting unit and comparing the extracted header information against the plurality of tables, the search engine creating a new header information for each received data packet based on comparison results, the search engine further being capable of discarding the extracted header information based on the comparison results;

a plurality of output queues, each output queue having an output rate and an availability indicator of queuing additional data;

a random early drop module for receiving the extracted header information from the search engine arbiter and distributing the extracted header information among the plurality of output queues, the random early drop module monitoring the availability indicator in each output queue and being capable of discarding the extracted header information;

a scheduling module in communication with the plurality of transfer rate control modules, the scheduling module scheduling transfer of the header identifier according to a predefined algorithm;

an aggregated transfer control module in communication with the scheduling module, the aggregated transfer control module receiving the header identifier from the scheduling module and controlling a transfer rate of the header identifier over an output link; and a plurality of transfer rate control modules for receiving the extracted header information from the plurality of output queues, each transfer rate control module being in communication with an output queue and controlling the output rate for the output queue, wherein the at least one lower layer processing unit receives the extracted header information and retrieves the data packet identified by the extracted header information and transmits the data packet to the destination identified in the new header information.

2. The apparatus of claim 1, further comprising a packet handling unit for processing the header information that needs special processing.

3. The apparatus of claim 1, wherein the new header information is stored in along with the data packet for which the new header information is created.

4. The apparatus of claim 1, wherein the at least one lower layer processing unit inserts the new header information in each data packet before transmitting the data packet to its destination.

5. The apparatus of claim 1, further comprising a plurality of rules that determine whether service should be denied to a data packet.

6. The apparatus of claim 1, wherein the plurality of tables further comprising a layer-2 table, a flow table, and a packet classifier and filter table.

7. The apparatus of claim 1, wherein the apparatus is an integrated circuit.

8. A gateway for processing data packets received from a plurality of data network and forwarding the data packets to their destination according to a predefined transfer rate, the gateway comprising: a plurality of lower layer processing units, each lower layer processing unit connecting to at least one data link and receiving data packets from the at least one data link; a header extracting unit in communication with the plurality of lower layer processing units, the header extracting unit being capable of extracting header information from the data packets received by the plurality of lower layer processing unit; at least one table having a plurality of entries of traffic information; a search engine arbiter unit for comparing the extracted header information received from the header extracting unit with the at least one table, the search engine arbiter being capable of generating a new header related information based on comparison results; a flow control unit for receiving the extracted header information from the search engine arbiter unit and discarding the data packet associated with the extracted header information according to a predefined criterion; and a plurality of output control units for receiving the extracted header information from the flow control unit and distributing the extracted header information to the lower layer processing unit, wherein the lower layer processing unit transmits a data packet associated with the extracted header information to a destination after inserting the new header related information in tile data packets, wherein each of the output control unit further comprises an output queue for receiving the extracted header information from the flow control unit; a transfer rate control unit for controlling a transfer rate for the output queue; and a scheduling unit for scheduling the extracted header information from each output queue to a lower layer processing unit specified by the new header related information, wherein the scheduling unit schedules data packets for transmission according to an algorithm of combined strict and weighted priorities.

9. The gateway of claim 8, wherein the search engine arbiter unit is capable of storing the new header related information into an external memory.

* * * * *